Sept. 20, 1966 R. E. GELLER ET AL 3,273,877
SEAT STRUCTURE
Filed April 26, 1965 2 Sheets-Sheet 1

INVENTORS
Roger E. Geller
Harry Otto Waag
BY
Their Attorney

United States Patent Office 3,273,877
Patented Sept. 20, 1966

3,273,877
SEAT STRUCTURE
Rodger E. Geller and Harry Otto Waag, Dayton, Ohio, assignors to General Motors Corporation, Detroit, Mich., a corporation of Delaware
Filed Apr. 26, 1965, Ser. No. 450,923
3 Claims. (Cl. 267—89)

This invention relates to seat structure, and, more particularly, to an adjustable elastomeric diaphragm seat assembly.

Various passengers and operators of a vehicle often have differing preferences for comfort of a seat structure in which they are carried. Provision is made for differences in height of the seat per se as well as length of legs and torso by change of seat track positioning. However, some individuals prefer to sit on soft and others on relatively harder seats. An object of the present invention is to provide an adjustable seat means wherein tautness of a supporting diaphragm for a foamed cushion portion is selectively variable by an occupant.

Another object of this invention is to provide a vehicle with a combination seat assembly including a seat portion rotatable as a "winding" device for the purpose of adjusting firmness of seat structure carried by a support member at least one end of which is secured to the rotatable portion.

A further object of this invention is to provide in combination for a seat assembly a first perforated diaphragm portion embedded in elastomeric foam means having trim surfacing on outer periphery thereof, a second perforated diaphragm portion as a bottom support for the foam means, and a "wind-up" device rotatably journaled though having both first and second diaphragm portions secured thereto for adjustment of stiffness of the foam means.

Another object of this invention is to provide a combination seat structure including a rotatably adjustable front tubular member selectively movable to vary stiffness of a foam seat portion having dual perforated diaphragm supports secured to the adjustable front tubular member.

Another object of this invention is to provide a combination seat structure including a rotatably adjustable front or rear tubular member selectively movable to vary stiffness of a covered foam seat portion having dual perforated diaphragm supports secured to the adjustable tubular member, at least one of the perforated diaphragm supports being embedded in the foam seat portion to enhance anchoring to the foam seat portion as well as for variation of firmness per se thereof.

Further objects and advantages of the present invention will be apparent from the following description, reference being had to the accompanying drawings wherein preferred embodiments of the present invention are clearly shown.

Figure 1:
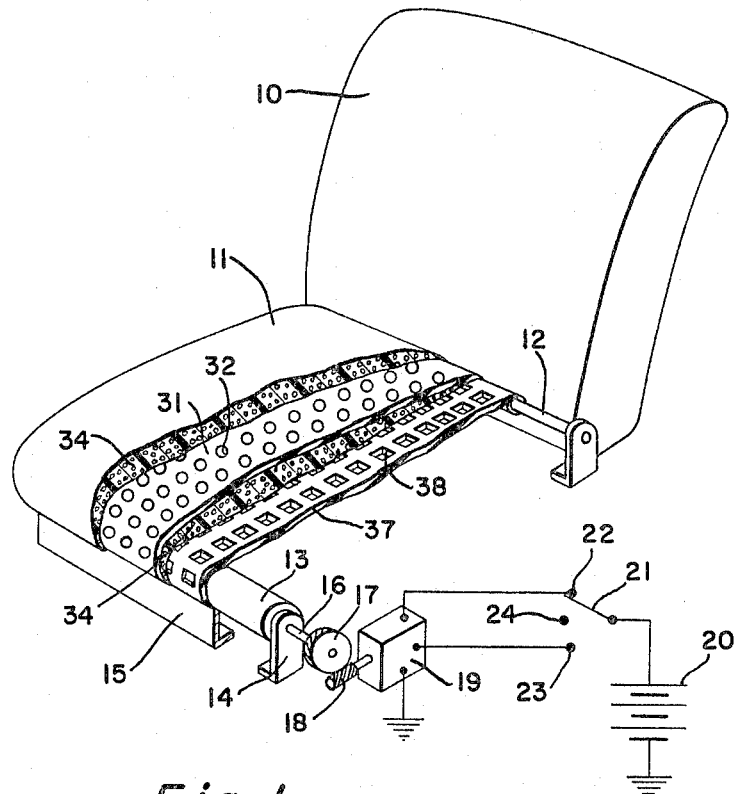
FIGURE 1 is a partially sectioned perspective view of a seat structure having features in accordance with the present invention.
Figure 2:
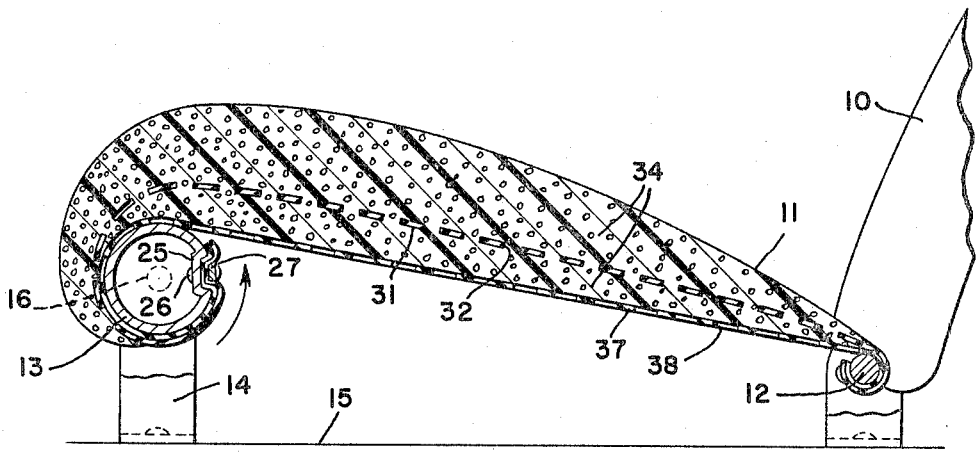
FIGURE 2 is a sectioned elevational view to show taut condition of seat structure of FIGURE 1.
Figure 3:
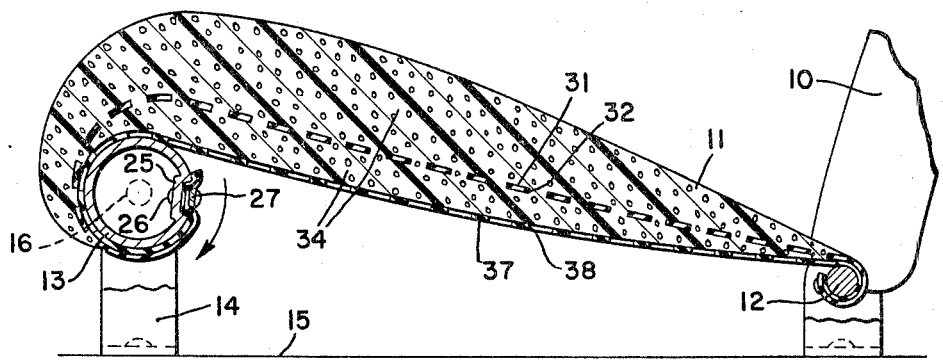
FIGURE 3 is a sectioned elevational view to show relaxed "soft" condition of seat structure of FIGURE 1.

FIGURE 1 illustrates a plan view of a vehicle seat structure including a back rest or rear portion 10 made of suitable metal structure with cushioning material in a substantially squared or rectangular configuration. A comparable seat portion 11 adjacent thereto has a multiple part configuration shown in further detail in cross-sectional views of FIGURES 2 and 3. There is a rear transverse rod or support 12 portion as well as a forward tubular portion 13 rotatably journaled respective thereto. The forward tubular portion 13 is elevated by a pair of journalling supports 14 secured at a lower end thereof to a base 15 which can be suitably movable on a seat track to provide adjustment of seat positioning as to height and length of legs in a well known manner. As indicated in FIGURES 1, 2 and 3, the rotatable tubular portion 13 can have a rotatable shaft means 16 carried by at least one end thereof and movable in either clockwise or counterclockwise directions. A gear 17 engaged by a worm member 18 of a reversible electric motor mounted adjacent to the seat portion 11 on base 15 can be provided to power clockwise and counterclockwise rotation of tubular member 13. A power source or battery 20 shown in FIGURE 1 has a switch means 21 shiftable to motor connector means 22 and 23 for reversible operation. A central position 24 is provided for switch means 21 during deenergization of motor means 19.

It is to be understood that a manual bell crank means can also be provided in place of motor means at reduced cost but the motor means installation is preferred. In place of the worm gear means a pawl and ratchet gear escapement mechanism can be used for manual bell crank operation. Thus either manual or motorized power transfer can result in clockwise or counterclockwise movement. Tubular member 13 represented in FIGURES 2 and 3 has a fastener or rivet means 26 extending radially inwardly from auxiliary retention means 27. Resilient seat materals are anchored by this fastening and retention means to rotatable tubular member 13 though such materials are fixed and secured suitably to rod or support 12.

A first grid or perforated diaphragm means 31 can be provided with a plurality of apertures or perforations 32. Optionally the grid or diaphragm means 31 can have thickened edges around aperatures or perforations 32 though preferably there is uniform thickness. The apertures or perforations 32 aid in anchoring the grid or perforated diaphragm means relative to a polymer foam means 34 as indicated in the drawings. The polymer foam means can have a composition in accordance for that disclosed for a "seat" portion in a copending application S.N. 421,526 filed December 28, 1964. A suitable trim covering portion of vinyl and the like can be provided over an outer surfacing of the polymer foam means 34. The grid or perforated diaphragm portion 31 can be made of soft rubber or synthetic elastomeric material. This first elastomeric grid or diaphragm means having the perforations and edging therewith is not only embedded in the polymer foam means 34 but also can have edging anchored by fastening and retention means at recessing as described earlier. This recessing and fastening collectively has inward displacement that assures relatively uniform outer periphery on the tubular portion or rotatable member 13.

Also in accordance with the present invention a second or auxiliary perforated diaphragm portion 37 having aperturing 38 therein is provided as a bottom support for the polymer foam means 34. This second perforated diaphragm portion 37 can also have an anchoring engagement with the fastening and retention means as indicated in FIGURES 2 and 3.

It is to be noted that by actuating the tubular member 13 counterclockwise as illustrated in FIGURE 2, it is possible to increase the tightness or tautness of the seat portion formed by the combination structure described in the foregoing paragraphs. Conversely, by a clockwise movement of the rotatable tubular support 13 represented in FIGURE 3 for example, it is possible to loosen or soften the support provided by both first and second diaphragm means. Collectively there is a progressive relaxation and sag in the seat structure for softness due to differing positions of diaphragm means 31–32 and 37–38 embedded in the polymer foam means and as a bottom support respectively.

Figure 4:
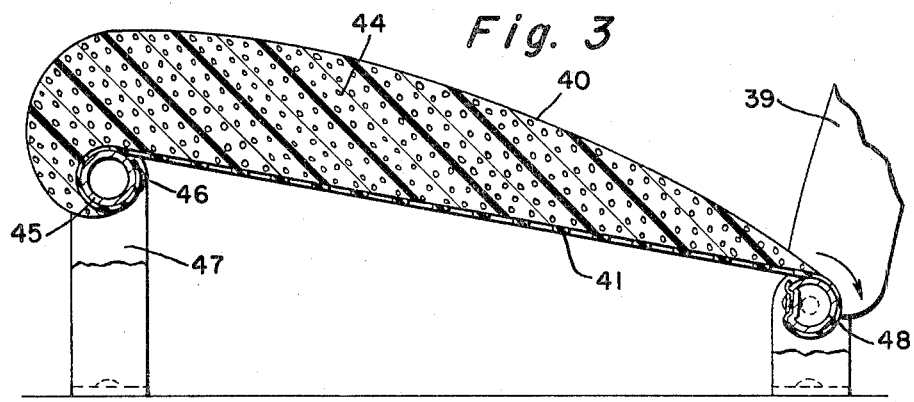
FIGURE 4 is a sectioned elevational view to show rear adjustment of seat structure in accordance with the present invention.

It is to be understood that the counterclockwise "wind-up" operation and vice versa can be suitably motorized with either a fluid actuated device or electric motor means having a gear or chain drive connection. Also in FIGURE 4 there is shown a slightly modified adjustable seat structure having a back 39 and lower seat portion 40. A perforated diaphragm 41 can have foam material 44 therewith as shown. The diaphragm means is anchored to a front transverse member 45 by fastening means 46. The member 45 is carried by supports 47. A rear tubular member 48 is provided with recessing fastening and retention means similar to that in FIGURES 2 and 3. The rear tubular member 48 is rotatable manually or as motorized in a manner previously described. Use of "wind-up" devices added in combination with front or rear tubular seat support cam provides a variable adjustment as to firmness of the vehicle seat structure dependent on preference of a particular passenger. In FIGURE 4, members 45 and 48 both have the same diameter.

Figure 5:
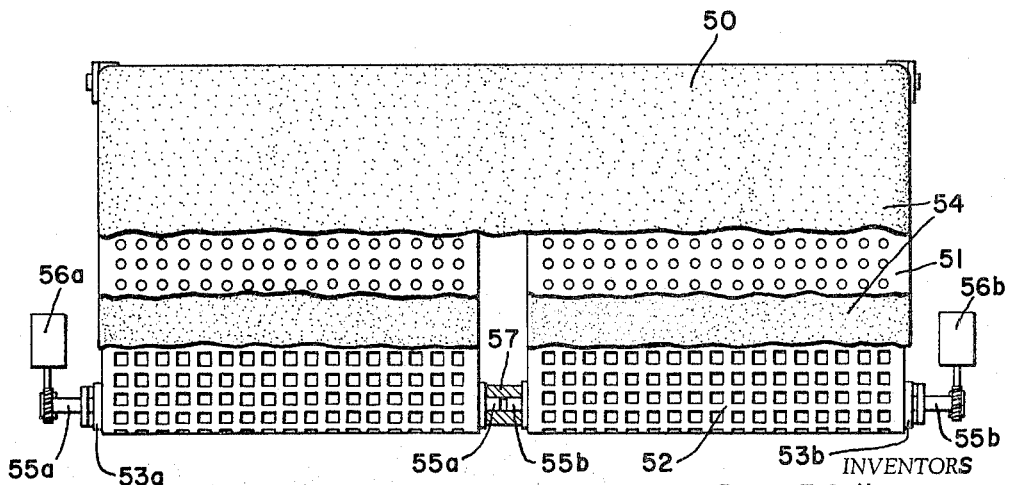
FIGURE 5 is a sectioned plan view of further seat structure in accordance with the present invention for a vehicle.

Features of the present invention are advantageous for vehicle bucket seat pad installations per se or arrangement can be made for individual passengers to have individual control over firmness of the seat on which they are carried. In FIGURE 5 a seat means 50 has a first perforated diaphragm 51 and a second perforated diaphragm 52 carried with foam material 54. Perforations in the bottom diaphragm means of FIGURES 1 and 5 are squared as an aid to anchoring thereof in recessing of the tubular portion. In FIGURE 5 a pair of tubular portions or members 53A and 53B have shaft extensions 55A and 55B respectively in opposite directions powered by worm-gear connections to motor means 56A and 56B respectively. A common bearing means 57 is located centrally therebetween. Thus the tubular portions and seat conditions can be adjusted independently of each other for a combination structure regardless of preferences of individual occupants of such seat structure. In each instance, the second or bottom diaphragm means is fixed at one end such as the rear but is also adjustable at the other end. The second or bottom diaphragm means is not totally embedded in foam material and serves as a "back-up" to provide further stiffness.

While the embodiments the present invention herein disclosed constitute preferred forms, it is to be understood that other forms might be adopted.

What is claimed is as follows:

1. Seat structure for vehicle installation, comprising, in combination, transverse support means including opposite elevated portions, a bottom diaphragm portion that extends across said support means, a polymer foam means on said bottom diaphragm portion, a further perforated diaphragm portion embedded in said polymer foam means and also extending across said support means, and rotatable means at one of said elevated support portions through which both said diaphragm portions are secured as a "winding" device for the purpose of adjusting firmness of said polymer foam means with said diaphragm portions.

2. The combination of claim 1 wherein at least one of said opposite elevated portions includes a rotatable tubular portion having a rotatable shaft means carried by at least one end thereof, said shaft means being movable in both clockwise and counterclockwise directions, and reversible motor means geared to said shaft means to transmit force that effects adjustment of tautness of said diaphragm portions.

3. The combination of claim 1 wherein at least one of said opposite elevated portions includes a front rotatable tubular portion having a rotatable shaft means carried by at least one end thereof, said front rotatable tubular portion having a recessing longitudinally thereof and fastening means for both said diaphragm portions collectively complementary to annular periphery of said front rotatable tubular portion.

References Cited by the Examiner

UNITED STATES PATENTS

| | | | |
|---|---|---|---|
| 2,822,032 | 2/1958 | Palmer | 267—89 |
| 2,832,398 | 4/1958 | Liljengren | 297—284 |
| 3,005,213 | 10/1964 | Brown et al. | 5—354 |

FOREIGN PATENTS 49,466   10/1934   Denmark.

ARTHUR L. LA POINT, *Primary Examiner.*